Sept. 11, 1962 J. H. O. HARRIES ET AL 3,053,144
OPTICAL PROJECTION DISPLAY DEVICES
Filed Aug. 7, 1959 2 Sheets-Sheet 1

Inventors
John H. O. Harries
Walter T. Wellford
By Ralph B. Stewart
Attorney

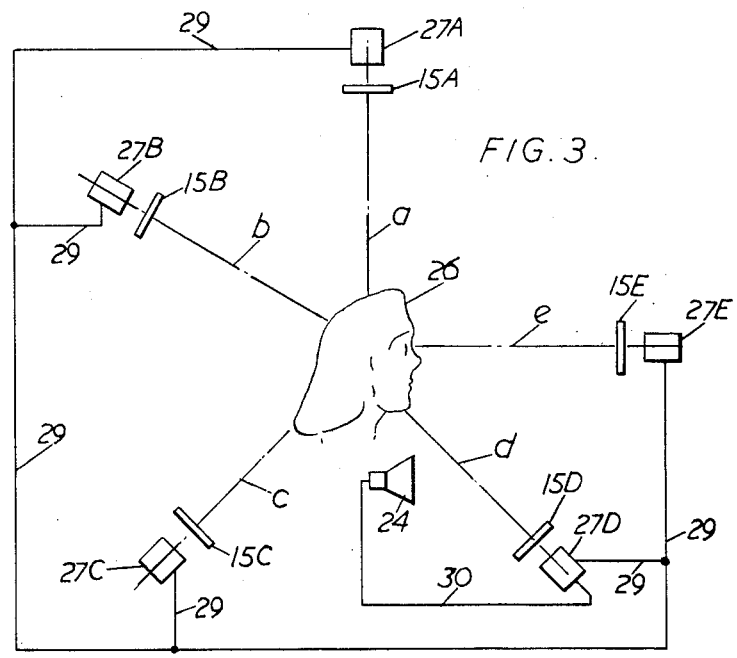
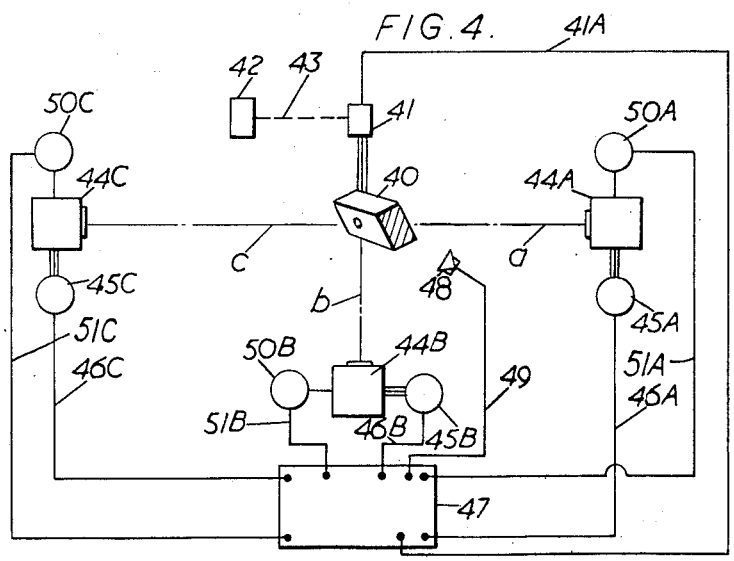

3,053,144
OPTICAL PROJECTION DISPLAY DEVICES
John Henry Owen Harries, Warwick, Bermuda, and Walter Thompson Welford, Blackheath, London, England, assignors to Harries Television Research Limited, Hamilton, Bermuda, a British company
Filed Aug. 7, 1959, Ser. No. 832,215
Claims priority, application Great Britain Aug. 13, 1958
18 Claims. (Cl. 88—24)

This invention relates to display devices for use, for example, for advertising and demonstration purposes and the object of the invention is to enable a two-dimensional image of some physical object to be formed on a transparency or other surface and to be projected without significant distortion by an optical system on to a three-dimensionally shaped viewing screen, the viewing screen being shaped in three dimensions so as to represent the three-dimensional shape of the physical object. The transparency or other surface may, for example, be a photographic film or television picture tube phosphor. The image projected on to the three-dimensionally shaped screen may be a coloured and moving image, and the device may be used to display on the three-dimensionally shaped viewing screen the appearance of the physical object in three dimensions of space and in different colour combinations. It will be realised that if a two dimensional image is thus projected from a transparency or other surface on to a three-dimensionally shaped viewing screen, parts of the screen will receive projected rays at oblique angles, which may vary widely from one part to an adjacent part. Asymmetrical "keystone" distortion of parts of the image on the three-dimensionally shaped screen will consequently occur and this may also be accompanied by symmetrical distortion of the "pincushion" or "barrel" kind. In addition, there will be difficulty in obtaining an adequate focus over all parts of the shaped screen.

In our co-pending application Serial No. 814,206 we have stated that "barrel" or "pincushion" distortion produced at a plane viewing screen positioned normally to the axis of the optical system can be corrected by an aspheric plate interposed in the path of the light from the projector to the viewing screen. It might be supposed in analogy that "keystone" distortion due to oblique image planes might also be corrected by a suitably shaped plate. However, we have pointed out in application Serial No. 814,206 that this is not so, because the differential equations defining the slope required for such a plate would constitute a Pfaffian system for which there is no solution in a form that would define a continuous surface. This means that we have proved there is no continuous surface of a lens or corrector plate such that oblique distortion can be corrected, and this, in turn, leads to an apparent impasse because it means that this distortion cannot be corrected by any known optical element, for example by a lens, prism or aspheric plate. However, we have also found that in projection systems that do not require a very high grade optical system this difficulty can be circumvented. In our said co-pending application we therefore proposed to use in the optical path of an oblique projection system a distortion-correcting device at least one surface of which varies in height, curvature and slope in a discontinuous manner and is composed of a number of facets separated by lines of discontinuity, the gradients of each facet being such that the path of the bundle of rays arriving at that facet from the object in the optical system are modified so as to displace the points of arrival of the rays at the image surface into such positions that distortion due to the obliquity of this surface to the optical axis is substantially avoided.

We have further found that a facetted correction device of this kind can be modified to perform the additional function of removing keystone distortion due to the use of a three-dimensionally shaped viewing screen which is a three-dimensional model of some physical object.

According to the present invention, a three-dimensionally shaped viewing screen has an image projected upon it by a projection system the optical object of which is a two-dimensional image, and the paths of the light rays from that image, before they reach the three-dimensional viewing screen, are corrected by a correction device at least one surface of which comprises a plurality of facets separated by lines of discontinuity of slope, the gradients of each facet being such that the path of the bundle of rays arriving at that facet from the two-dimensional image are modified so as to displace the points of the arrival of the rays at the three-dimensional object or screen into such positions that keystone distortion where the projected rays meet the viewing screen obliquely is substantially avoided.

The two-dimensional image may be provided on a transparency or on an opaque surface, or it may be formed on a phosphor screen by the impact of an electron beam thereon. If desired, the transparency may be part of a cinematograph film which is pulled through the projector in the usual way. Suitable synchronised sound effects may be added.

The slope or gradient of each facet of the correction device, its position and shape, can be calculated by the usual methods of numerical computation used by those skilled in the optical art, guided by the geometry of the optical system and the shape and obliquity of the three-dimensional object or screen. In greater detail, it is first necessary to decide at which point in the system the facetted corrector should be placed. In order that its effect on the distortion should be as great as possible and on the other aberrations as small as possible, it will be understood by optical designers that it should be placed as far as possible from the aperture stop or exit pupil of the projector up to, say, half-way to the three-dimensional object or screen. If it is nearer to this object its effect on distortion also becomes greatly diminished. There will be other considerations, such as the close proximity of other projectors, which set a lower limit to the distance from the screen. Thus a definite position is found.

Next a series of principal rays is calculated and the rays are traced from the optical object to the three-dimensional viewing screen (excluding for the moment the corrector element) at different distances from the axis, and the distortion is calculated. This must be done at sufficiently close spacings as will be found by experience to give enough data for computing the facets and rays which must be taken in a number of meridian planes at suitable angles to that one which is perpendicular to the three-dimensional object. The method of ray-tracing and calculation of distortion can be any one of a number well-known to optical designers.

Next, for any given ray the point in which it ought to have met the three-dimensional viewing screen if there had been no distortion is found and from this it is possible to calculate the inclination to the normal which the surface of the corrector facet should have where this ray meets it. This is done by assuming an index of refraction for the corrector corresponding to a material of which it is convenient to make it (such as glass or polymethyl methacrylate) and applying Snell's law of refraction, to find the required wedge angle of the corrector facet. The angle can be on either surface of the plate.

This wedge angle must then be determined for each facet by interpolating as necessary between the angles found for the principal rays traced. The number of facets is chosen by arranging that the jump in ray deviation between neighbouring facets corresponds to less than a picture point on the three-dimensional viewing screen.

The abrupt steps between facets are not objectionable provided the element is placed at a considerable distance from the stop and provided the image is not required to be of much better definition than is commonly found in, for example, television systems and advertising displays. The facets must be small enough to provide a reasonable rate of change of gradient according to the above-mentioned equations to avoid undue image distortion, and they must not be so small as to produce diffraction effects. The facets can be in the form of squares, triangles or hexagons or any two-dimensional repeated design. The gradient will, in general, change more rapidly in some parts of the plate than in others and it may, therefore, be convenient to have smaller facets in the parts where the gradient changes rapidly and larger facets elsewhere.

If desired, the slope of each facet may be modified in known manner to include additional corrections for other distortions, for example pincushion or barrel distortion, and furthermore each facet may be made not merely prismatic but lenticular in order to improve the focus of the image over the three-dimensionally shaped surface of the viewing screen. Such lenticular facets cannot be used to compensate for the different distance of different parts of the three-dimensionally shaped viewing screen from the optical system in cases in which the object field surface of the optical system is very curved, as in mirror systems of wide field angle. In this case, the focus can be improved by curving the object transparency so that its shape follows the curved object field. The mounting surface (such as a cinematograph film, transparency or television phosphor) upon which the two-dimensional image is produced, may also be curved, tilted or appropriately shaped to improve focus of the image on the corresponding facets of the three-dimensionally shaped viewing screen. As an example, when the three-dimensional viewing screen or a large area thereof tilts as a whole with respect to the optical axis of the apparatus, the focus over the viewing screen can also be improved by tilting the object transparency, or the corresponding area thereof, as a whole. If a projection lens is used, the tilting of the object transparency is such that parts of the viewing screen which are further from the lens correspond to parts of the transparency which are nearer to the lens, and vice versa. In mirror projection systems, the direction of displacement is reversed.

According to a subsidiary feature of the invention, the three-dimensional shaping of the viewing screen and the characteristics portrayed by the two-dimensional image, are produced by copying or, for example, photographing the same model from various viewpoints in a known manner. This common model is therefore represented as regards three-dimensional form by the three-dimensional shape of the viewing screen and in other respects by a two-dimensional image which is projected through the facets of the correction device on to the three-dimensional viewing screen from the appropriate direction.

Means may also be provided mechanically to move the three-dimensionally shaped viewing screen in synchronism with the corresponding movements portrayed by the two-dimensional image. Corresponding synchronised movements of the projector may be provided. In those cases where both the three-dimensional viewing screen and the two-dimensional image are produced from a common model (such as a piece of mechanism or a person) the movements of this common model may be synchronised by, for example, servo mechanisms and recording tape with those of the three-dimensional viewing screen and, in some instances, with those of the projector.

In order that the invention may be better understood, several embodiments thereof will now be described, by way of example, with reference to the accompanying drawings, in which:

FIGURE 3 shows an optical system for projecting a number of two-dimensional transparencies on to the three-dimensional viewing screen; and FIGURE 4 represents apparatus for photographing a moving model and recording the movements thereof.

Figure 1:
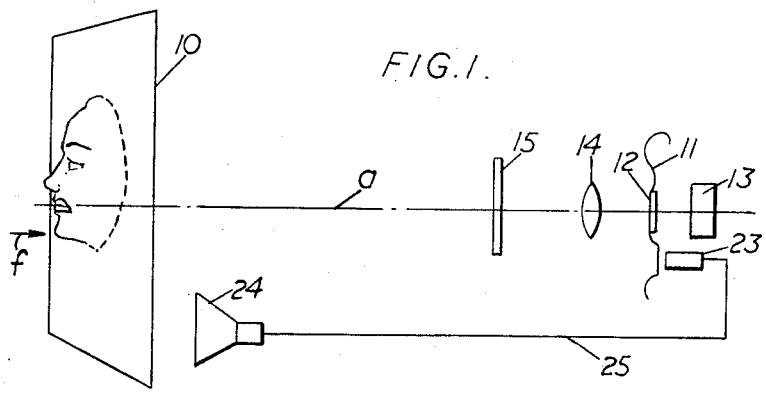
FIGURE 1 shows diagrammatically an optical system embodying the invention.

FIGURE 1 shows a translucent rear projection viewing screen 10 having its surface shaped into a three-dimensional representation of a physical object, in this case the head and face of a person. This screen is viewed from the front as indicated by the arrow $f$. A cinematograph colour film 11 is fed through the gate 12 of a cinematograph projector which is represented diagrammatically by the projection lamp 13 and optical system 14. The coloured image on the cinematograph film 11 is of the same head and face represented three-dimensionally at the viewing screen, and this image is projected along the optical axis $a$ of the system on to the three-dimensionally shaped screen 10 through a facetted corrector plate 15. This corrector plate has, as explained above, the property of removing optical distortion and defocusing effects otherwise associated with the projection of a two-dimensional image existing on cinematograph film 11 on to the three-dimensionally shaped viewing screen 10.

Figure 2:
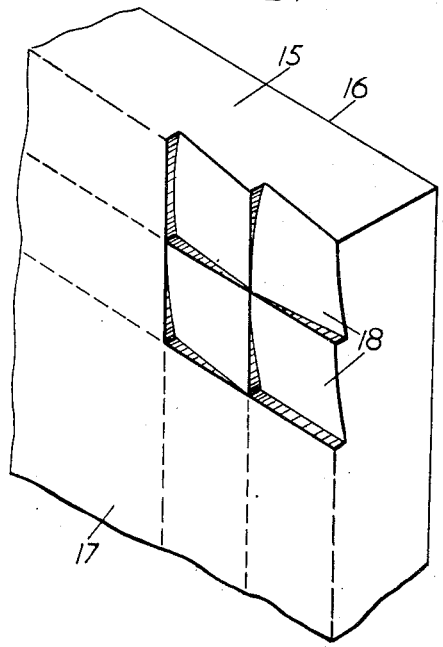
FIGURE 2 shows part of a typical form of facetted correction plate suitable for a viewing screen of the kind shown in FIGURE 1.

FIGURE 2 shows a suitable type of corrector device 15. This device consists of a light-transmitting plate having a plane rear surface 16 and a front surface 17 which is in the form of a large number of facets 18 of rectangular shape. The height, curvature and slope of each facet is determined by the method previously described so as to avoid keystone distortion and, if desired, to reduce pincushion or barrel distortion and defocusing. The dimensions of each facet vary with the dimensions of the three-dimensionally shaped viewing screen, and no table of dimensions can be given for a particular case without specifying in considerable detail the form of the viewing screen in three dimensions. However, the method of determining the form of each facet of the plate 15 will be clear to one skilled in the art after reading the preceding discussion, and some additional guidance may be obtained from the dimensions given in Table 2 of our said copending application, although these dimensions relate to a facetted corrector plate for an oblique projection system and a plane viewing screen.

The plate 15 may be made from plastic material (for example polymethyl methacrylate) by injection moulding.

Referring back to FIGURE 1, the cinematograph film 11 may include a synchronised soundtrack and a suitable sound pick-up device which is indicated diagrammatically by the block 23. A loudspeaker 24 is fed from the pick-up device 23 by means of the link 25 so that sound effects are added.

As the two-dimensional colour cinematograph film 11 runs through the projector it will produce at the three-dimensional viewing screen 10 a three-dimensional colour image which may change in colour and to some extent in detail, as will be explained below. This, together with the sound effects from the loudspeaker, can be used, for example, to demonstrate different combinations of cosmetics and hair colouring on the three-dimensional representation of a face shown at the viewing screen 10 in FIGURE 1. Lettering or legends can also be added to the image.

The shaping of the three-dimensional face on the viewing screen can, if desired, be relatively crude, the details being provided by the projected image from the cinematograph film; thus, for example, the three-dimensional shaping of the viewing screen can omit the iris, eyelashes and eyebrows which will be supplied by the projected image from the cinematograph film which can therefore be arranged to appear to move and change. Thus, the effect of a moving three-dimensional image can be obtained.

Both the three-dimensional modelling of the viewing screen 10 and the two-dimensional image on the cinematograph film 11 in FIGURE 1 are reproduced by photographic or other suitable means from the same physical object. Thus, the three-dimensional face shown on the viewing screen 10 in FIGURE 1 may be shaped from measurements or photographs of the face of a living person. Two-dimensional colour photographs of this person constitute successive frames of the cinematograph film 11.

FIGURE 3 shows a three-dimensional viewing screen 26 which is a model of a person's head in the round. A plurality of cinematograph projectors 27A . . . 27E and facetted corrector plates 15A . . . 15E are arranged around the three-dimensional viewing screen or model 26 so that their optical axes $a, b, c, d$ and $e$ meet the surfaces of the model from several different directions. These directions are chosen so that the three-dimensional surface of the screen can be viewed by the audience simultaneously from various directions. By means of the links 29 the movements of the cinematograph films through the projectors 27A . . . 27E are synchronised. The visual illusion of a three-dimensional object changing in colour and in detail is thereby produced. A soundtrack and pick-up may be provided with respect to one of the projectors (for example, the projector 27D, as shown in FIGURE 3), and the sound is fed by means of a link 30 to a loudspeaker 24. Thus sound and speech may be added to the three-dimensional visual representation. In this instance, once again, it will be found preferable to omit details from the three-dimensional bust 26 and to provide them by the moving picture images obtained from the cinematograph projectors.

The three-dimensional screen 26 is copied from the same model, which may be, for example, the head and shoulders of a living person who was also photographed from the directions $a, b, c$, etc. to make the two-dimensional cinematograph films used in the projectors 27A . . . 27E. Known means of producing a three-dimensional representation from a number of cine-photographs taken of a living person may be used to shape the three-dimensionally shaped screen or bust 26. The sound which is reproduced by the loudspeaker 24 may be recorded at the same time as the two-dimensional cinematograph films are photographed.

In an alternative embodiment of the invention, television projection devices may be used instead of cinematograph projectors and may be regarded as represented by the blocks 27A to 27E in FIGURE 3. The links 29 then represent links carrying common synchronising and scanning pulses which link and synchronise the television projectors 27A to 27E so as to synchronise the respective images and the sound. The loudspeaker 24 may be energised from an audio signal. The respective video signals supplied to the television projectors, the audio signal supplied to the loudspeaker and the synchronising signals and scanning pulses may be provided by tape recordings.

FIGURE 4 shows a means of providing movements of a three-dimensional viewing screen in order to add to the realism of a display. A physical object 40 is moved by a servo mechanism 41, the movements being directed manually by means of the control mechanism 42 which is linked to the servo mechanism 41 by the link 43. Cinematograph cameras 44A, 44B and 44C are arranged to view the physical object 40 along the respective optical axes $a, b, c$. Whilst the physical object 40 is moved (so as, for example, to demonstrate its shape and physical properties) cinematograph pictures of it are taken simultaneously on three cinematograph films by the three cameras 44A, 44B and 44C. In order to follow the movements of the physical object 40 these cameras may, if desired, be manually tilted during this process. The three cameras 44A, 44B and 44C are attached respectively to servo mechanisms 45A, 45B and 45C; signals from these servo mechanisms are transferred by means of the links 46A, 46B and 46C to a tape recorder 47. Signals from the servo mechanism 41 are also transferred by the link 41A to the tape recorder 47. Any sounds produced by the physical object 40 are picked up by the microphone 48 and transferred to the tape recorder by means of the link 49. The cinematograph film in each of the cameras 44A, 44B and 44C is drawn through the camera by means of servo mechanisms 50A, 50B and 50C, signals from which are again linked to the tape recorder 47 by the links 51A, 51B and 51C. A tape record is thus obtained which records the relative positions of the physical object 40, of the cameras 44A, 44B and 44C, and of the film in these cameras, together with any sound made by the physical object 40.

The reproducing device can also be explained with reference to FIGURE 4. A three-dimensional viewing screen having the same shape as the object 40 is substituted for that object. If desired, this viewing screen may be a greatly enlarged representation of the object 40. The cameras 44A to 44C are substituted by projectors, each one having a facetted corrector element (not shown in FIGURE 4) inserted in the path of the light in the manner of FIGURES 1 and 2. The optical axes $a, b$ and $c$ and positions of these projectors will be the same at any given time as those of the cameras. The recorder is replaced by a tape reproducer through which is fed the tape record previously recorded as explained above. The tape reproducer feeds information from the tape record to the servo mechanisms 41, 50A, 50B, 50C, 45A, 45B and 45C, and also feeds the recorded audio signals to a loudspeaker (not shown). The control mechanism 42 and link 43 shown in FIGURE 4 are omitted. Amplifiers may be added in the links where required. It will be seen that the movements of the physical object 40 will be reproduced by the corresponding three-dimensional screen. Similarly, the movements of the cameras 44A, 44B and 44C will be reproduced by the movements of the corresponding projectors. The sounds picked up by the microphone M will be reproduced in appropriate timing by the loudspeaker. The images on the respective films photographed in the cameras 44A to 44C will be projected by means of the corresponding projectors on to the three-dimensional screen which will, therefore, display the movements, appearance and sounds of the physical object which were originally recorded by the tape recorder.

Television reproducing cameras and corresponding projectors may be substituted for the cinematograph cameras and projectors shown in FIGURE 4. Schmidt optical projection systems may be used.

Although the optical projection system described above uses a light-transmitting plate as a corrector element, it would also be possible to use a mirror having a facetted surface.

We claim:

1. An optical projection system comprising a three-dimensionally shaped viewing screen, an optical object which is a two-dimensional image, and a correction device by means of which the paths of the light rays from the two-dimensional image are corrected before reaching the three-dimensional viewing screen, said correction device having at least one surface which varies in slope and which comprises a plurality of facets separated by lines of discontinuity of slope, the gradients of each facet being chosen with regard to the bundle of rays which reach that facet from the optical object so as to displace the points of arrival of the rays at the three-dimensional viewing screen into such positions that keystone distortion where the rays meet the viewing screen obliquely is substantially avoided.

2. An optical projection system according to claim 1, including a plurality of projectors by means of which a plurality of images are projected on to the three-dimensionally shaped viewing screen.

3. An optical projection system according to claim 1, in which said three-dimensionally shaped viewing screen is formed approximately to the shape of a physical object, but does not include surface details of the latter.

4. An optical projection system according to claim 1, in which the three-dimensional shape of said viewing screen and said two-dimensional image are both produced by copying from the same physical object.

5. An optical projection system according to claim 1, in which means are provided mechanically to move said three-dimensionally shaped viewing screen in synchronism with corresponding movements which appear successively in said two-dimensional image.

6. An optical projection system according to claim 5, including electrically controlled devices whereby the recorded movements of the object are applied to said viewing screen.

7. An optical projection system comprising a three-dimensionally shaped viewing screen, an optical object which is a two-dimensional image, and a light-transmitting corrector plate through which the light passes before reaching the viewing screen, said corrector plate having at least one surface which varies in slope and which comprises a plurality of facets separated by lines of discontinuity of slope, the gradients of each facet being such that the paths of a bundle of rays from the two-dimensional image which pass through that facet are modified so as to displace the points of arrival of the rays at the three-dimensional viewing screen into such positions that keystone distortion where the rays meet the viewing screen obliquely is substantially avoided.

8. An optical projection system according to claim 7, in which each facet of said correction device is of lenticular form, whereby the focusing of the image on said three-dimensionally shaped screen is improved.

9. An optical projection system according to claim 7, in which the gradients of each facet are chosen so that the points of arrival of the rays at said viewing screen are displaced into such positions that axially symmetric distortions are also substantially avoided.

10. An optical projection system according to claim 7, in which said facets vary in size and are smaller where the change of gradient is greatest.

11. An optical projection system according to claim 7, employing mirror projection means, comprising a mount on which said two-dimensional image is produced and which is shaped so that some parts of the two-dimensional image are nearer to the optical elements of the projection system than other parts, whereby defocusing of the projected image over the surface of the three-dimensionally shaped viewing screen is reduced, the nearest parts of the two-dimensional image corresponding to parts of the viewing screen which are the closest to said optical elements.

12. An optical projection system according to claim 11, in which said three-dimensionally shaped viewing screen tilts, as a whole, with respect to the optical axis of the system, and in which said mount for the two-dimensional image tilts, as a whole, with respect to the optical axis so as to render more uniform the focusing of the projected image at said viewing screen.

13. A lens optical projection system according to claim 7, comprising a mount on which said two-dimensional image is produced and which is shaped so that some parts of the two-dimensional image are nearer to the optical elements of the projection system than other parts, whereby defocusing of the projected image over the surface of the three-dimensionally shaped viewing screen is reduced, the nearest parts of the two-dimensional image corresponding to parts of the viewing screen which are the furthest from said optical elements.

14. An optical projection system according to claim 7, wherein said two-dimensional image is produced by photographic means.

15. An optical projection system according to claim 7, comprising an electron discharge display tube having a phosphor screen and in which said two-dimensional image is produced by scanning said phosphor screen.

16. An optical reproduction system including a plurality of recording means for recording a plurality of two-dimensional images of a physical object, a three-dimensionally shaped viewing screen the shape of which corresponds to that of the physical object, a plurality of optical projectors by means of which said recorded two-dimensional images are projected on to said viewing screen, each optical projector including a correction device by means of which the paths of the light rays from the two-dimensional image are corrected before reaching the three-dimensional viewing screen, said correction device having at least one surface which varies in slope and which comprises a plurality of facets separated by lines of discontinuity of slope, the gradients of each facet being chosen with regard to the bundle of rays which reach that facet from the optical object so as to displace the points of arrival of the rays at the three-dimensional viewing screen into such positions that keystone distortion where the rays meet the viewing screen obliquely is substantially avoided.

17. An optical reproduction system according to claim 16, including means for recording the movements of the physical object and means for producing corresponding movements of said three-dimensional viewing screen.

18. An optical reproduction system according to claim 17, including means for recording the movements of the physical object and of a recording means photographing the latter, and means whereby the recorded movement data controls the movements of said three-dimensional viewing screen and of the projecting means corresponding to said recording means.

References Cited in the file of this patent

UNITED STATES PATENTS

| | | |
|---|---|---|
| 521,064 | Vander Weyde | June 5, 1894 |
| 1,596,458 | Schiesari | Aug. 17, 1926 |
| 1,651,574 | Beechlyn | Dec. 6, 1927 |
| 2,309,752 | Cooke | Feb. 2, 1943 |
| 2,758,200 | Franck | Aug. 7, 1956 |

OTHER REFERENCES

These "Curved" Screens, International Projectionist, vol. 28, Issue 3, page 16, March 1953.